(12) United States Patent
Amaladoss et al.

(10) Patent No.: US 9,124,583 B1
(45) Date of Patent: Sep. 1, 2015

(54) DEVICE REGISTRATION USING DEVICE FINGERPRINT

(71) Applicant: Bank of America Corporation, Charlotte, NC (US)

(72) Inventors: Vijayanandraj Amaladoss, Nadu (IN); Andrew L. Saar, Sandy Springs, GA (US); Daniel Lynn Carpenter, Matthews, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 14/274,023

(22) Filed: May 9, 2014

(51) Int. Cl.
*H04L 29/06* (2006.01)

(52) U.S. Cl.
CPC ........ *H04L 63/0876* (2013.01); *H04L 63/0861* (2013.01)

(58) Field of Classification Search
CPC .......... G06F 21/51; G06F 21/33; H04L 63/10
See application file for complete search history.

(56) References Cited

U.S. PATENT DOCUMENTS

| | | | | |
|---|---|---|---|---|
| 7,819,322 B2* | 10/2010 | Hammad et al. | | 235/449 |
| 8,601,109 B2* | 12/2013 | Johannsen | | 709/223 |
| 8,862,730 B1* | 10/2014 | Hernacki et al. | | 709/225 |
| 8,869,245 B2* | 10/2014 | Ranganathan et al. | | 726/4 |
| 8,949,954 B2* | 2/2015 | Etchegoyen | | 726/5 |
| 9,032,217 B1* | 5/2015 | Brandwine | | 713/185 |
| 2002/0099659 A1* | 7/2002 | Swentor | | 705/44 |
| 2006/0293989 A1* | 12/2006 | Morrison et al. | | 705/35 |
| 2008/0301699 A1* | 12/2008 | Macer | | 718/107 |
| 2011/0093503 A1 | 4/2011 | Etchegoyen | | |
| 2011/0288940 A1 | 11/2011 | Horadan et al. | | |
| 2012/0084203 A1* | 4/2012 | Mehew et al. | | 705/41 |
| 2012/0102317 A1* | 4/2012 | Mathur et al. | | 713/156 |
| 2012/0311686 A1* | 12/2012 | Medina et al. | | 726/7 |
| 2013/0242795 A1* | 9/2013 | Heen et al. | | 370/252 |

FOREIGN PATENT DOCUMENTS

EP 2 323 062 A1 5/2011

OTHER PUBLICATIONS

Phys, "Several Top Websites Use Device Fingerprinting to Secretly Track Users," Oct. 12, 2013, pp. 1-2.*
Aite, "Corporate Mobile Banking: A Look at J.P. Morgan Access Mobile," Oct. 2011, pp. 1-18.*

(Continued)

*Primary Examiner* — Kaveh Abrishamkar
*Assistant Examiner* — James J Wilcox
(74) *Attorney, Agent, or Firm* — Michael A. Springs; Moore & Van Allen PLLC; Anup Shrinivasan (57) ABSTRACT

Embodiments of the invention are directed to apparatuses, methods and computer program products for registering a device. An exemplary apparatus is configured to: determine a device accesses an application; determine whether the device is a trusted device; in response to determining the device is not a trusted device, forward an approval request; and in response to receiving approval, register the device based on a device fingerprint associated with the device.

9 Claims, 5 Drawing Sheets

(56) References Cited

OTHER PUBLICATIONS

Sandhu, "Role-Based Access Control Models," Feb. 1996, George Mason University and SETA Corporation, pp. 38-47.*

Secureauth. "Secureauth IDP—Device Fingerprinting Low-Friction, BYOD Authentication: Assert Your Identity". Whitepaper. Secureauth.com. http://www.secureauth.com/wp-content/files__mf/devicefingerprintingwp.pdf. 14 pages. Retrieved May 9, 2014.

* cited by examiner

DEVICE REGISTRATION USING DEVICE FINGERPRINT

BACKGROUND

There is a need to register and validate a device through which a transaction (e.g., a financial transaction) is being performed or executed.

BRIEF SUMMARY

In some embodiments, an apparatus is provided for registering a device. The apparatus comprises a memory; a processor; and a module stored in the memory, executable by the processor, and configured to: determine a device accesses an application; determine whether the device is a trusted device; in response to determining the device is not a trusted device, forward an approval request; and in response to receiving approval, register the device based on a device fingerprint associated with the device.

In some embodiments, the device is associated with a first-level employee, and wherein the determining the device accesses the application comprises validating authentication credentials associated with the first-level employee.

In some embodiments, determining whether the device is a trusted device comprises determining whether the device has a device fingerprint or whether the device fingerprint has changed noticeably.

In some embodiments, the approval request is forwarded to a second device, wherein the second device is associated with a second-level employee, wherein the second-level employee is associated with a higher level than a first-level employee associated with the device.

In some embodiments, the apparatus validates authentication credentials input by the second-level employee onto the second device.

In some embodiments, the device comprises a mobile device.

In some embodiments, the device comprises a tablet computing device.

In some embodiments, the device fingerprint is associated with a device token.

In some embodiments, the device fingerprint comprises at least one of a resolution of the device, an operating system of the device, a browser on the device, or a plug-in installed on the device.

In some embodiments, the device fingerprint is encrypted.

In some embodiments, the application comprises a financial institution application.

In some embodiments, the approval request is forwarded to at least one of a financial institution system or an authentication system.

In some embodiments, a method is provided for registering a device. The method comprises: determining, using a computing device processor, a device accesses an application; determining, using a computing device processor, whether the device is a trusted device; in response to determining the device is not a trusted device, forwarding, using a computing device processor, an approval request; and in response to receiving approval, registering, using a computing device processor, the device based on a device fingerprint associated with the device.

In some embodiments, a computer program product is provided for registering a device. The computer program product comprises a non-transitory computer-readable medium comprising a set of codes for causing a computer to: determine a device accesses an application; determine whether the device is a trusted device; in response to determining the device is not a trusted device, forward an approval request; and in response to receiving approval, register the device based on a device fingerprint associated with the device.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to apparatuses, methods and computer program products for registering and/or validating a device. The present invention enables determination of whether a transaction (e.g., a financial institution transaction) is originating from an authorized device. The present invention runs on a wide variety of operating platforms and requires minimal maintenance efforts from an entity managing and/or utilizing the authorized device. Additionally, the preset invention may not require the entity to install any software on the authorized device. Still additionally, the present invention is cost-effective and easy to roll out onto a multitude of devices.

A first-level employee (e.g., a lower-level employee such as a sales associate) may access an application on a device for the first time. When the first-level employee accesses the application, the first-level employee may be requested to enter authentication credentials (e.g., a username, a password, or the like). The authentication credentials are verified by the system that hosts the application to determine whether the first-level employee is permitted to access the application. As used herein, a first-level employee is an employee associated with a level less than a threshold level. On a first access of the application from the device, the device requires approval from a second-level employee (e.g., a manager or any other employee who is associated with an employee level greater than the threshold level). Therefore, when the device accesses the application, a system that hosts the application determines that the device is accessing the application, determines that the device is not a trusted device, and therefore, a device approval request may be forwarded from the device to the second-level employee (or a device associated with the second-level employee). The second-level employee logs onto the system (e.g., the system that hosts the application or some other financial institution authentication system) and adds the device as a trusted device. In some embodiments, in order to add the device as a trusted device, the second-level employee logs onto the system via the second-level employee's device. In other embodiments, in order to add the device as a trusted device, the second-level employee needs to log onto the system via the device itself (i.e., the first-level employee's device).

Once the device is added as a trusted device, a device token is placed in the device, wherein the device token acts as a second level of authentication. The device token is created based on information obtained from the device. For example, the information includes at least one of a resolution (e.g., a screen resolution) of the device, an operating system (including the operating system version) of the device, a browser (including the browser's version) on the device which accesses the application, plug-ins (including each plug-in's version) installed on the device, or the like. Any subsequent interaction of the device with a system that hosts the application are intercepted and validated to ensure that the interactions are emerging from a trusted device. If during the interception, the system that hosts the application determines that the device cannot be validated because of a noticeable change in device fingerprint, the system may forward another approval request to the second-level employee. As used herein, a noticeable change in device fingerprint is when the change in device fingerprint is equal to or greater than a threshold level of change. For example, a noticeable change may be triggered when at least one cookie in the device is cleared or deleted, or when the operating system version or browser version of the device is changed (e.g., upgraded or downgraded). A non-noticeable change in device fingerprint is when the change in device fingerprint is less than the threshold level of change.

In order to create a device fingerprint, the device may forward information to any system described herein (e.g., the first system, second system, or the like). The system described herein refers to the system that hosts the application or some other financial institution system such as a financial institution authentication system. The device may forward the information based on a request received from the system or without any receiving any request from the system. For example, the request may be for particular types of information from the device (e.g. operating system information, browser information, plug-in information, or the like). The information may be combined by the system to form the device fingerprint. In other embodiments, the device may itself combine the information to form the device fingerprint and send the device fingerprint to the system.

Additionally, the system may hash the device fingerprint and encrypt the device fingerprint into a string (e.g., 32/64 bit string) using a secured application programming interface (API). The system may then send the encrypted device fingerprint (e.g., an encrypted value) along with an additional parameter back to the device. Together, the encrypted value and the additional parameter form a device token cookie. This device token cookie is validated by the system described herein on a subsequent interaction between the device and the system. In other embodiments, the hashing and encrypting processes may be performed by the device itself, and the device may itself create and store the device token cookie described herein.

In other embodiments, the present invention may be directed to site to site virtual private network (VPN). In such embodiments, the access of the application from the device is validated via a VPN network. In still other embodiments, the present invention may be directed to certificate-based authentication. In such embodiments, the access of the application from the device is validated by the system based on a certificate received from the device. Additionally, in some embodiments, the system may validate access by validating information associated with the certificate or by sending a return certificate to the device.

Figure 1:
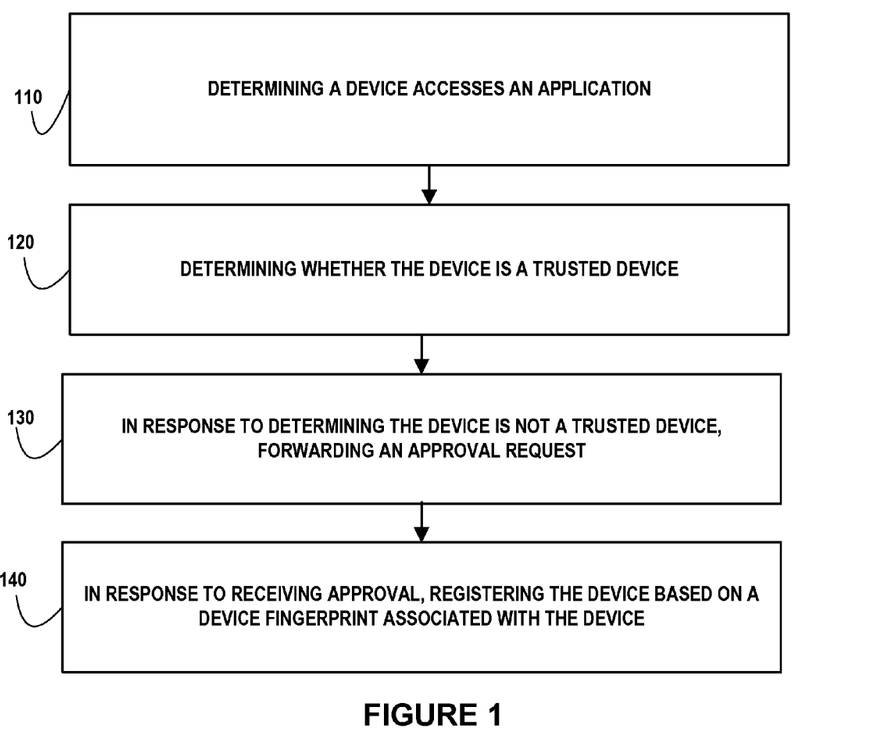
FIG. 1 is an exemplary process flow for device registration, in accordance with embodiments of the present invention.

Referring now to FIG. 1, FIG. 1 presents an exemplary process flow for device registration. At block 110, the process flow comprises determining a device accesses an application. At block 120, the process flow comprises determining whether the device is a trusted device. At block 130, the process flow comprises in response to determining the device is not a trusted device, forwarding an approval request. At block 140, the process flow comprises in response to receiving approval, registering the device based on a device fingerprint associated with the device.

Figure 2:
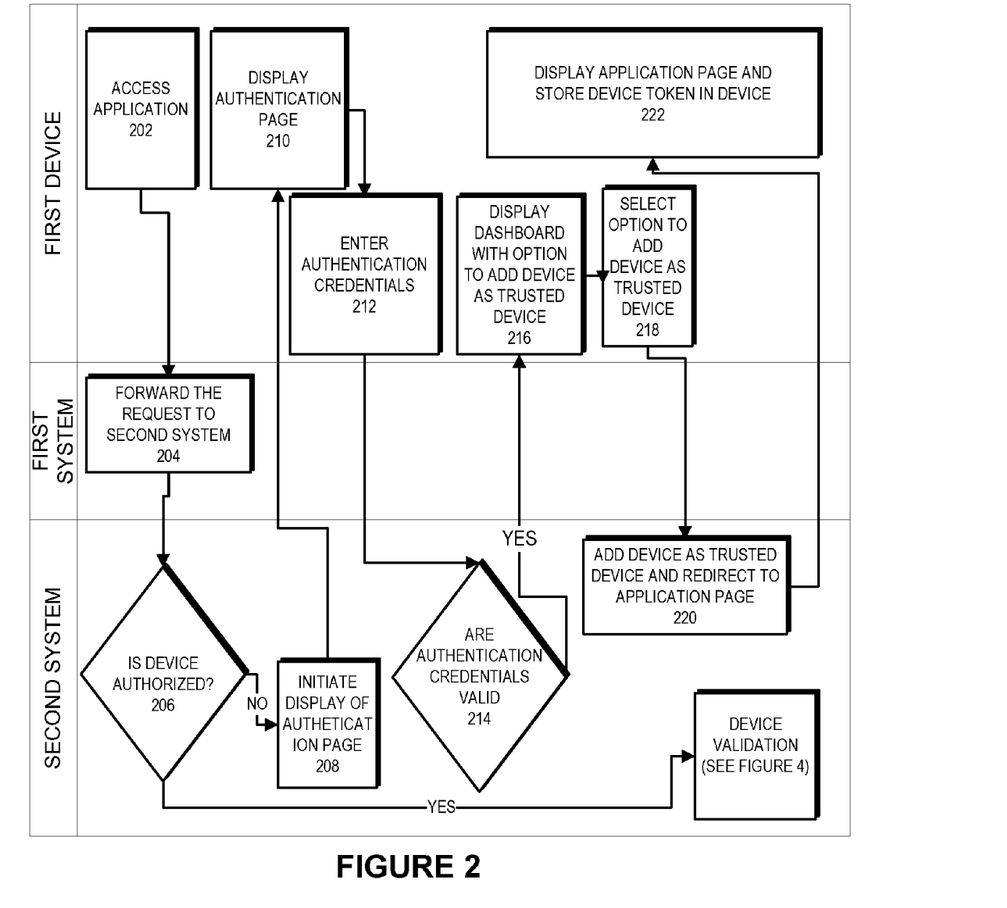
FIG. 2 is another exemplary process flow for device registration, in accordance with embodiments of the present invention.

Referring now to FIG. 2, FIG. 2 presents another exemplary process flow for device registration. At block 202, an application is accessed by a first device. The first device may be a point-of-sale device or a kiosk associated with a first-level employee (e.g., a sales associate at a retailer). The application may be a credit application or any other financial institution application. This access of the application is detected by a first system (e.g., a financial institution credit system). At block 204, the application request is forwarded to a second system to determine if the first device is an authorized device. The first device may be an authorized device if the use of the first device for the credit application has been previously authorized by the first system and/or the second system. The second system may be a financial institution authentication system. At block 206, the second system determines whether the first device is authorized to access the application. If the first device is not authorized, display of an authentication page on the first device (or another device associated with a second-level employee) is initiated at block 208. The authentication page enables a second-level employee (e.g., an employee such as a manager who has a higher status level than the first-level employee) to provide authentication credentials (e.g., a username and password) and add the first device as a trusted device. If the device is authorized, the process flow moves to the device validation process of FIG. 4.

If the device is authorized, the second system causes the first device to initiate display of an authentication page at block 210. At block 212, authentication credentials are entered by a second-level employee (i.e., a second-level employee). The second-level employee either enters the credentials on the first device associated with the first-level employee or a second device associated with the second-level employee. At block 214, the second system determines whether the authentication credentials are valid. If the authentication credentials are valid, at block 216, a dashboard is displayed on the device on which the authentication credentials were entered with an option to add the first device as a trusted device. At block 218, a selection is received to add the first device as a trusted device. At block 220, the second system adds the device as a trusted device and redirects the first device to display an application page associated with the application (e.g., the credit application). In order to add the first device as a trusted device, device fingerprint information may also be collected from the first device as described herein. At block 222, the first device displays the application page and the first user may execute a transaction using the application on the first device. Additionally, at block 222, the first device stores a device token. Additionally, at block 222, the first device stores a device token. The device token may have been generated by at least one of the first system, the second system, or the first device.

Figure 3:
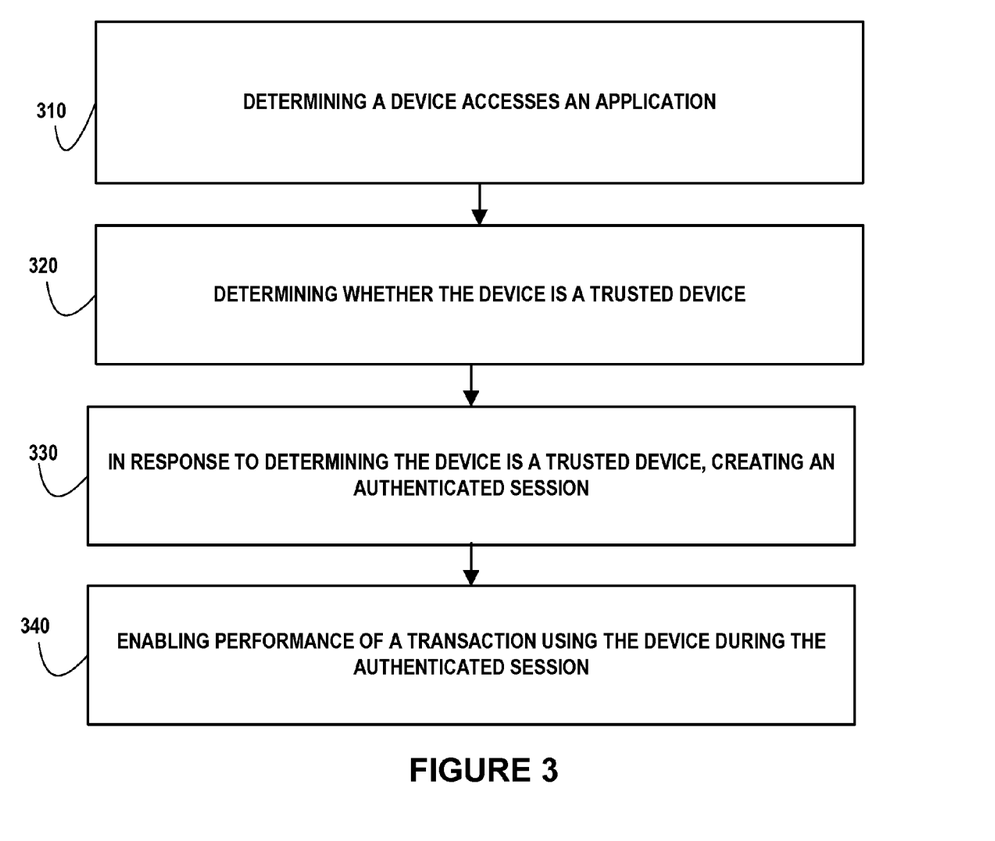
FIG. 3 is an exemplary process flow for device validation, in accordance with embodiments of the present invention.

Referring now to FIG. 3, FIG. 3 presents an exemplary process flow for device validation. At block 310, the process flow comprises determining a device accesses an application. At block 320, the process flow comprises determining whether the device is a trusted device based on a device fingerprint associated with the device (and/or based on authentication credentials received from the device). At block 330, the process flow comprises in response to determining the device is a trusted device, creating an authenticated session. At block 340, the process flow comprises enabling performance of a transaction using the device during the authenticated session.

Figure 4:
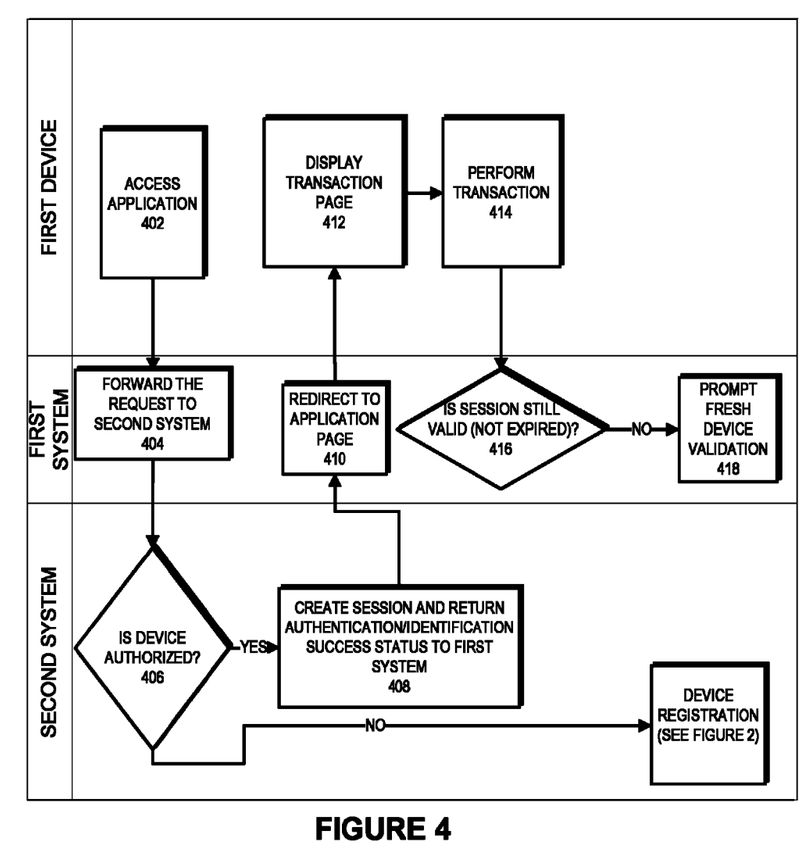
FIG. 4 is another exemplary process flow for device validation, in accordance with embodiments of the present invention.

Referring now to FIG. 4, FIG. 4 presents another exemplary process flow for device validation. At block 402, an application is accessed by a first device as described herein (e.g., with respect to FIG. 2). This access of the application is detected by a first system as described herein (e.g., with respect to FIG. 2). The application may also be the application described with respect to FIG. 2. At block 404, the application request is forwarded to a second system as described herein (e.g., with respect to FIG. 2). At block 406, the second system determines whether the device is authorized to access the application. If the device is authorized, at block 408, the second system creates a session (e.g., an authenticated session or validated session) and returns an authentication or identification (or validation) success status to the first system. The first device may be authorized based on device fingerprint information received from the first device and/or authentication credentials received from the first device (e.g., a first-level employee's authentication credentials). If the device is not authorized, the process flow moves to the device registration process of FIG. 2.

After the execution of block 408, the first system redirects the first device to an application page at block 410. Subsequently, a transaction page is displayed at block 412 and a transaction is performed or executed (e.g., by the first-level employee) on the transaction page at block 414. At block 416, the first system determines whether the session is still valid or not expired. For example, the session may be valid for a predetermined period (or after a predetermined number of performed transactions) or may expire after a predetermined period of inactivity. If the session is still valid and not expired, the first system prompts a fresh device validation at block 418. Any feature described with respect to any of the process flows described herein may be applicable to any other process flow. Additionally, each of the process flows described herein may be performed or executed, either singly or in combination, by one or more of the devices, systems, or apparatuses described herein.

Figure 5:
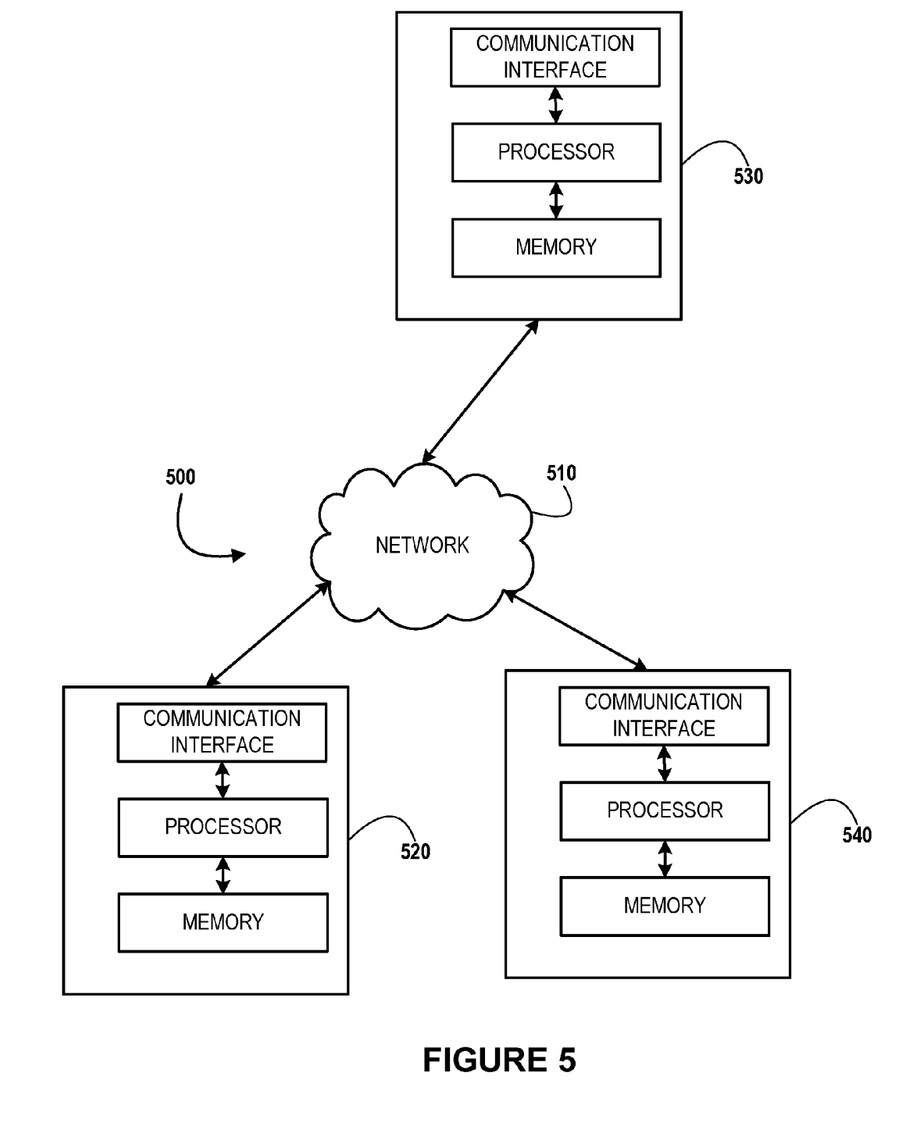
FIG. 5 is a block diagram illustrating technical components of an environment for implementing the various processes described herein, in accordance with embodiments of the present invention.

Referring now to FIG. 5, FIG. 5 presents an exemplary block diagram of the network environment 500 for implementing the process flow described herein, in accordance with embodiments of the present invention. As illustrated, the environment 500 includes a network 510, a first device 520, a first system 530, and a second system 540. As shown in FIG. 2, the first device 520, the first system 530, and the second system 540 are each operatively and selectively connected (e.g., via one or more wired or wireless mechanisms) to the network 510, which may include one or more separate networks.

Each of the first device 520, the first system 530, and the second system 540 is a computing device that comprises a communication interface, a processor, a memory, and a module stored in the memory, executable by the processor, and configured to perform the various processes described herein. Each communication interface described herein enables communication with other apparatuses via the network 510.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the apparatus in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the apparatus in which it resides to implement the functions of that system.

In accordance with embodiments of the invention, the term "module" with respect to an apparatus may refer to a hardware component of the apparatus, a software component of the apparatus, or a component of the apparatus that includes both hardware and software. As used herein, a module may include one or more modules, where each module may reside in separate pieces of hardware or software. As used herein, an apparatus may alternatively be referred to as a "system" or a "device."

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, apparatus, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system" or "apparatus." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for registering a device, the apparatus comprising:
    a memory;
    at least one processor; and
    a module stored in the memory comprising computer instruction code that is executable by the at least one processor, and structured to cause the at least one processor to:
        determine that a first device is accessing an application, wherein the first device is associated with a first-level employee, and wherein the determining that the first device is accessing the application comprises validating authentication credentials associated with the first-level employee using the first device;
        determine whether the first device is a trusted device or not;
        in response to determining the first device is not a trusted device, forward an approval request to a second device associated with a second-level employee to request approval for the first-level employee to access the application using the first device, wherein the second-level employee is associated with a higher level than the first-level employee associated with the first device;
        receive approval from the second device, where the approval involved validation authentication credentials input by the second-level employee onto the second device as part of the approval;
        in response to receiving approval, register the device based on a device fingerprint associated with the device, wherein the device fingerprint is associated with a device token, wherein the device fingerprint comprises at least one of a resolution of the device, an operating system of the device, a browser on the device, or a plug-in installed on the device;

monitor one or more interactions between the device and the application, wherein monitoring further comprises intercepting the one or more interactions to determine that there is a change in the device fingerprint associated with the device;

determine that the change is within a predetermined threshold level of change based on at least monitoring the one or more interactions; and authenticate the one or more interactions based on at least determining that the change is within the predetermined threshold level of change.

2. The apparatus of claim 1, wherein determining whether the device is a trusted device comprises determining whether the device has a device fingerprint or whether the device fingerprint has changed noticeably.

3. The apparatus of claim 1, wherein the device comprises a mobile device.

4. The apparatus of claim 1, wherein the device comprises a tablet computing device.

5. The apparatus of claim 1, wherein the device fingerprint is encrypted.

6. The apparatus of claim 1, wherein the application comprises a financial institution application.

7. The apparatus of claim 1, wherein the approval request is forwarded to at least one of a financial institution system or an authentication system.

8. A method for registering a device, the method comprising:

determining, using a computing device processor, that a first device is accessing an application, wherein the first device is associated with a first-level employee, and wherein the determining that the first device is accessing the application comprises validating authentication credentials associated with the first-level employee using the first device;

determining, using a computing device processor, first device is a trusted device or not;

in response to determining the first device is not a trusted device, forward an approval request to a second device associated with a second-level employee to request approval for the first-level employee to access the application using the first device, wherein the second-level employee is associated with a higher level than the first-level employee associated with the first device;

receiving, using a computing device processor, approval from the second device, where the approval involved validation authentication credentials input by the second-level employee onto the second device as part of the approval in response to receiving approval, registering, using a computing device processor, the device based on a device fingerprint associated with the device, wherein the device fingerprint is associated with a device token, wherein the device fingerprint comprises at least one of a resolution of the device, an operating system of the device, a browser on the device, or a plug-in installed on the device;

monitoring one or more interactions between the device and the application, wherein monitoring further comprises intercepting the one or more interactions to determine that there is a change in the device fingerprint associated with the device;

determining that the change is within a predetermined threshold level of change based on at least monitoring the one or more interactions; and authenticating the one or more interactions based on at least determining that the change is within the predetermined threshold level of change.

9. A computer program product for registering a device, the computer program product comprising:

a non-transitory computer-readable medium comprising a set of codes for causing a computer to:

determine that a first device is accessing an application, wherein the first device is associated with a first-level employee, and wherein the determining that the first device is accessing the application comprises validating authentication credentials associated with the first-level employee using the first device;

determine whether the first device is a trusted device or not;

in response to determining the first device is not a trusted device, forward an approval request to a second device associated with a second-level employee to request approval for the first-level employee to access the application using the first device, wherein the second-level employee is associated with a higher level than the first-level employee associated with the first device;

receive approval from the second device, where the approval involved validation authentication credentials input by the second-level employee onto the second device as part of the approval;

in response to receiving approval, register the device based on a device fingerprint associated with the device, wherein the device fingerprint is associated with a device token, wherein the device fingerprint comprises at least one of a resolution of the device, an operating system of the device, a browser on the device, or a plug-in installed on the device;

monitor one or more interactions between the device and the application, wherein monitoring further comprises intercepting the one or more interactions to determine that there is a change in the device fingerprint associated with the device;

determine that the change is within a predetermined threshold level of change based on at least monitoring the one or more interactions; and authenticate the one or more interactions based on at least determining that the change is within the predetermined threshold level of change.

* * * * *